(12) United States Patent
Lah

(10) Patent No.: US 7,115,190 B2
(45) Date of Patent: Oct. 3, 2006

(54) TANGENTIAL DISPENSER AND SYSTEM FOR USE WITHIN A DELAYED COKING SYSTEM

(75) Inventor: Ruben F. Lah, West Jordan, UT (US)

(73) Assignee: Curtiss-Wright Flow Control Corporation, Roseland, NJ (US)

( * ) Notice: Subject to any disclaimer, the term of this patent is extended or adjusted under 35 U.S.C. 154(b) by 370 days.

(21) Appl. No.: 10/411,849

(22) Filed: Apr. 10, 2003

(65) Prior Publication Data

US 2004/0163305 A1    Aug. 26, 2004

Related U.S. Application Data

(60) Provisional application No. 60/448,936, filed on Feb. 21, 2003.

(51) Int. Cl.
*C10B 51/00* (2006.01)
*B01D 3/00* (2006.01)

(52) U.S. Cl. .................. 201/25; 202/239; 196/135; 196/155

(58) Field of Classification Search ............... 201/25; 202/239; 196/155, 135
See application file for complete search history.

(56) References Cited

U.S. PATENT DOCUMENTS

| 2,717,865 A | * | 9/1955 | Kimberlin, Jr. et al. .... 208/106 |
| 4,666,585 A | * | 5/1987 | Figgins et al. ............. 208/131 |
| 5,041,207 A | * | 8/1991 | Harrington et al. ......... 208/131 |

* cited by examiner

*Primary Examiner*—N. Bhat
(74) *Attorney, Agent, or Firm*—Kirton & McConkie; Michael F. Krieger

(57) ABSTRACT

The present invention features a tangential injection system for use within a delayed coking system, or any other similar system. The tangential injection system comprises a spool, a tangential dispenser, and a hydro blasting system, wherein the tangential dispenser comprises a delivery main surrounding the perimeter of the spool and that functions to deliver a residual byproduct or other material to a plurality of feed lines positioned at a position or at distances around the delivery main for the purpose of providing tangential dispensing of the residual byproduct into the vessel, thus effectuating or inducing even thermal distribution throughout the vessel.

41 Claims, 4 Drawing Sheets

TANGENTIAL DISPENSER AND SYSTEM FOR USE WITHIN A DELAYED COKING SYSTEM

RELATED APPLICATIONS

This application claims priority to U.S. Provisional Application Ser. No. 60/448,936, filed Feb. 21, 2003, and entitled, "Tangential Dispenser System for Use Within a Delayed Coking System."

BACKGROUND

1. Field of the Invention

The present invention relates to a system and device for injecting or disbursing a residual by-product into a vessel, such as the several types of petroleum feed stocks into a coke drum. In particular, the present invention relates to a system and device, namely a tangential dispenser adaptable for use within a delayed coking system, wherein the tangential dispenser functions to provide a more efficient, safe, and durable way to inject and/or deposit the manufactured residual petroleum byproduct into a vessel, and particularly a coke drum vessel.

2. Background of the Invention and Related Art

In the hydrocarbon processing industry, many refineries recover valuable products from the heavy residual oil that remains after refining operations are completed. This recovery process is known as delayed coking and produces valuable distillates and coke in large vessels or coke drums. Coke drums are usually in operation in pairs so that when one coke drum is being filled with the byproduct or residual material, the feed may be directed to an empty drum so that the filled drum may be cooled and the byproduct purged from the coke drum, a process known as decoking. This allows the refinery process to operate in a continuous manner, without undue interruption.

The process of delayed coking, and particularly the steps of directing a residual byproduct into an inlet from a feed source and allowing the residual byproduct to be dispensed or disposed within the vessel, comprises utilizing a dispenser that functions to dispose or direct the byproduct into the vessel. FIG. 1 illustrates one type of prior art dispenser or dispensing system common in the industry.

Specifically, FIG. 1 illustrates a cut away perspective view of a prior art dispenser or dispensing system attached or coupled to vessel 2, shown as a coke drum commonly used in the coking industry. Vessel 2 comprises a cylindrical sidewall support body 4 and a lower flange 5. Lower flange 4 further comprises a plurality of bolt holes 7 that are used to receive high strength bolts therein to securely couple vessel 2 to another matching flanged member, such as a de-header valve or an intermediate spool assembly. Attached or coupled to or integrally formed with vessel 2 is a byproduct dispenser, shown as inlet 6, shown in the form of a cylindrical pipe having a flange segment and an opening 8 to allow inlet 6 to be in fluid connection with the interior of vessel 2. As a feed line is appropriately attached to inlet 6, the residual byproduct in the feed line is received through opening 8 in inlet 6, routed through the pipe structure of inlet 6, and dispensed or disposed within vessel 2.

The rather simple design of inlet 6 as the dispenser for the residual byproduct within vessel 2 comprises significant drawbacks. Primarily, due to the pressure within the feed, as well as the high temperature of the residual byproduct, there is significant force within the feed as it enters inlet 6. As a result of this force and the simple, linear design of inlet 6, the residual byproduct is literally shot into or essentially bursts into the interior of vessel 2, hitting the inner side of sidewall support structure 4 opposite the exit area of inlet 6. Even though vessel 2 is pre-heated to a temperature similar to the incoming byproduct, what results is the collision of this high temperature, high velocity stream of residual byproduct with the inside surface in sidewall support body 4 that is perpendicular or substantially perpendicular to the direction of the flow of the fast moving, heated residual byproduct. Not surprisingly, this creates or causes significant problems. First, the sudden influx and contact of heated, pressurized material into a stagnant vessel causes stark heat distribution variances throughout vessel 2, namely within sidewall support body 4, and lower flange 5 and the bolts connecting the vessel to another component, such as a de-header valve, throughout the process. The heated residual byproduct is injected into vessel 2 and slams into the opposite sidewall, which instantly begins to heat the immediate and surrounding area of the sidewall. This impact point on the sidewall is the thermal center from which heat is initially distributed to the other adjacent areas of vessel 2. Once the residual byproduct enters the vessel, the opposing sidewall and the surrounding area is heated. Over time, the residual material gathers and builds up inside vessel 2 at a location opposite inlet 6. As this happens, the continuing influx of residual byproduct alternatively impacts the cooled, newly formed coke rather than the sidewall, altering the thermal center. As additional coking takes place, and as additional residual byproduct continues to be injected into vessel 2, the point of impact, and thus the thermal center, continues to move away from the opposing sidewall toward inlet 6, resulting in uneven heat distribution or thermal variance. This process is incapable of providing even heat distribution within the vessel because as each point or location increasing in distance from the thermal center will naturally be relatively cooler.

Uneven heat distribution or thermal variance existing within vessel 2 as a result of the influx of the residual byproduct in the manner described above, induces uneven stress distribution within vessel 2, lower flange 5, and the corresponding flanged member coupled to vessel 2, as well as the bolts coupling the two together. As mentioned above, the delayed coking process typically comprises at least two vessels so that while one is being filled the other is being purged of the material therein and prepped to receive another batch of byproduct. Thus, during the off-cycle when a vessel is being purged of its contents it will cool and return to a state of equilibrium. It is this cyclical pattern of dispensing hot residual byproduct into vessel 2 and subsequently hydro-blasting the byproduct that leads to the thermal differential and stress within vessel 2. It is this cyclical loading and unloading or stressing and unstressing of vessel 2 that is referred to as thermal ratcheting. Thermal ratcheting is essentially the weakening or fatiguing of vessel 2 and its component parts, which leads to a reduction in the useful life of vessel 2.

FIG. 2 illustrates another type of prior art dispenser or dispensing system common in the industry. Specifically, FIG. 2 illustrates a perspective view of a prior art dispenser or dispensing system attached or coupled to vessel 2, shown as a coke drum commonly used in the coking industry. Vessel 2 comprises a cylindrical sidewall support body 4 and a lower flange 5. Lower flange 4 further comprises a plurality of bolt holes 7 that are used to receive high strength bolts therein to securely couple vessel 2 to another matching flanged member 9, such as a de-header valve or an intermediate spool assembly. Attached or coupled to or integrally formed with vessel 2 is a first byproduct dispenser, shown as inlet feed 1, and a second byproduct dispenser, shown as inlet feed 3 positioned opposite and coaxial with one another. Each of inlet feeds 1 and 3 function to dispense byproduct into vessel 2 during a delayed coking process. Although the addition of another dispenser or inlet feed helps to alleviate some of the problems discussed above under FIG. 1, namely the lack of uniform heat distribution, the remedial effect or benefit of two opposing inlet feeds on these problems is only minimal. A significant amount of uneven heat distribution and thermal variance still exists within or throughout vessel 2 because of the inability of the inlet feeds 1 and 3 to dispense byproduct in a controlled and predictable manner. For example, byproduct from each feed inlet 1 and 3 is dispensed into the vessel. If the pressure within each inlet feed are similar, the byproduct from each feed inlet will meet somewhere in the middle and cause byproduct to be randomly displaced within vessel 2. On the other hand, in the even that a pressure differential exists between inlet feeds 1 and 3, then the byproduct will be even more randomly dispensed and the problems of thermal variance increased. Moreover, even if the pressures within each of inlet feeds 1 and 3 are uniform and the byproduct enters vessel 2 at the same or substantially the same time, the depositing and settling of the coke byproduct within vessel 2 is still unpredictable, such that build-up of coke byproduct within vessel 2 could be anywhere, including at the center, along the sidewall, somewhere in between, or any combination of these. As a result, the problems discussed above with respect to the design illustrated in FIG. 1 are equally applicable to the design shown in FIG. 2.

Generally speaking, advances in the field of delayed coking and its associated technology have come only gradually as competing companies have built upon existing technologies or operational methods by making improvements and modifications to base designs or concepts that have been in use for years. Through this process, some of the technologies utilized in the delayed coking industry that have been derived from their parent designs have become optimized, meaning that their benefits that can be obtained from them have been maximized.

Moreover, the general trend in the delayed coking industry is towards increased safety, durability, efficiency, and reliability. However, the prior art designs discussed above do not function to meet such goals as these designs are less than efficient and outdated. As such, there is a need to improve the way the delayed coking process is carried out, and particularly, how the residual byproducts are injected into the large coke drums.

SUMMARY AND OBJECTS OF THE INVENTION

In accordance with the invention as embodied and broadly described herein, the present invention features a tangential injection system for use within a delayed coking system, or any other similar system. The tangential injection system comprises a spool, a tangential dispenser, and a hydro blasting system, wherein the tangential dispenser comprises a delivery main surrounding the perimeter of the spool and that functions to deliver a residual byproduct or other material to a plurality of feed lines positioned at a position or at distances around the delivery main for the purpose of providing tangential injection of the residual byproduct into the vessel, thus effectuating or inducing even thermal distribution throughout the vessel.

In a preferred embodiment, the tangential dispenser comprises a delivery main for delivering a residual byproduct, wherein the delivery main comprises an inlet and a curved pipe segment integrally formed with the inlet, and wherein the curved pipe segment surrounds, at least in part, the perimeter or outside of a reservoir vessel to facilitate even dispensing or dispersion of the residual byproduct into the reservoir vessel; a plurality of feed lines in fluid connection with the delivery main, the feed lines comprising a piped section having an oblique end in fluid connection with a similarly oblique port in the reservoir vessel, wherein the feed lines dispense the residual byproduct into the reservoir vessel in a tangential manner to provide even thermal distribution throughout the reservoir vessel during a manufacturing process.

The present invention further features a tangential injection system for use within a delayed coking system, wherein the tangential injection system comprises: a spool fittable to a coke drum and a de-header valve; a tangential dispenser coupled to the spool, the tangential dispenser comprising similar components as described above; and a hydro blasting system having multiple access lines allowing connection or access to the tangential dispenser, wherein the multiple access lines provide access to the delivery main for hydro blasting the delivery main and the tangential injection system via a cleaning device used to prepare these elements for further cleaning, as well as to purge the tangential dispenser of residual byproduct present in the event of a cycle interruption or any incident which may cause a solidification of coke within the tangential injection system.

Finally, the present invention features a method of tangentially dispensing a residual byproduct into a reservoir vessel via one or more feed lines oriented tangentially or substantially tangentially to a delivery main that extends around the entire reservoir vessel or a part thereof.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 4, is not intended to limit the scope of the invention, as claimed, but is merely representative of the presently preferred embodiments of the invention.

The presently preferred embodiments of the invention will be best understood by reference to the drawings wherein like parts are designated by like numerals throughout.

The present invention describes a method and system for improving the dispensing of residual byproducts into a container, and particularly the dispensing of petroleum byproducts into a coke drum as part of a delayed coking process, thus improving the safety, reliability, economy, ease of operation and maintenance, utility, lifespan, and efficiency of the components in a delayed coking process.

Figure 1:
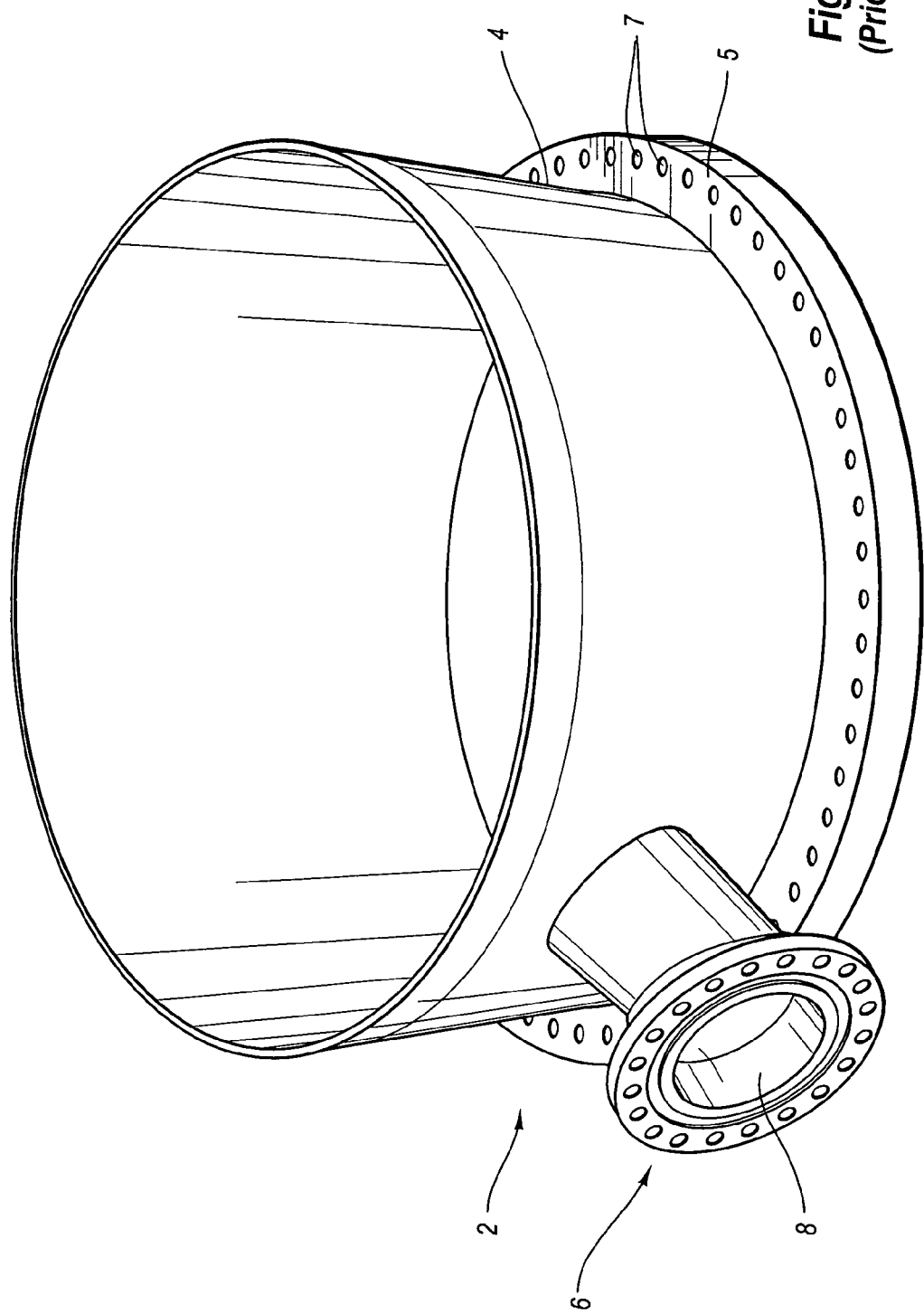
FIG. 1 illustrates a cut away perspective view of one prior art dispenser or dispensing system as coupled to a vessel in the form of a coke drum.
Figure 2:
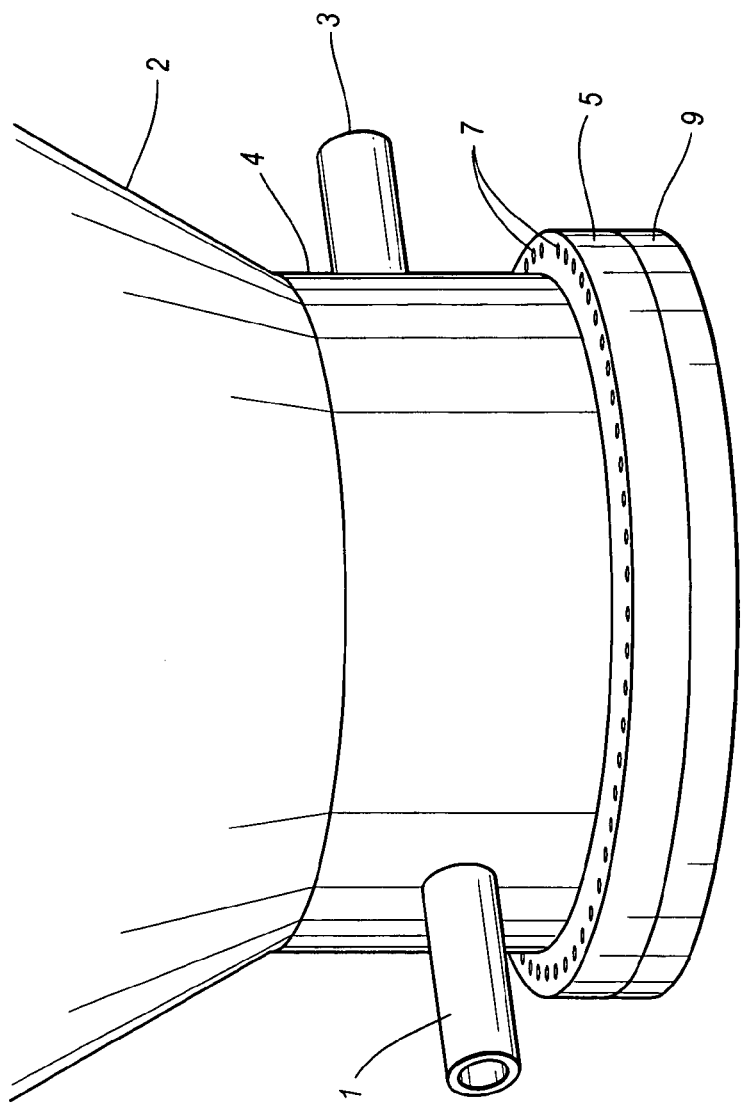
FIG. 2 illustrates a perspective view of another prior art dispenser of dispensing system, namely a system comprising two opposing, co-axial inlet feeds coupled to a vessel in the form of a coke drum.
Figure 3:
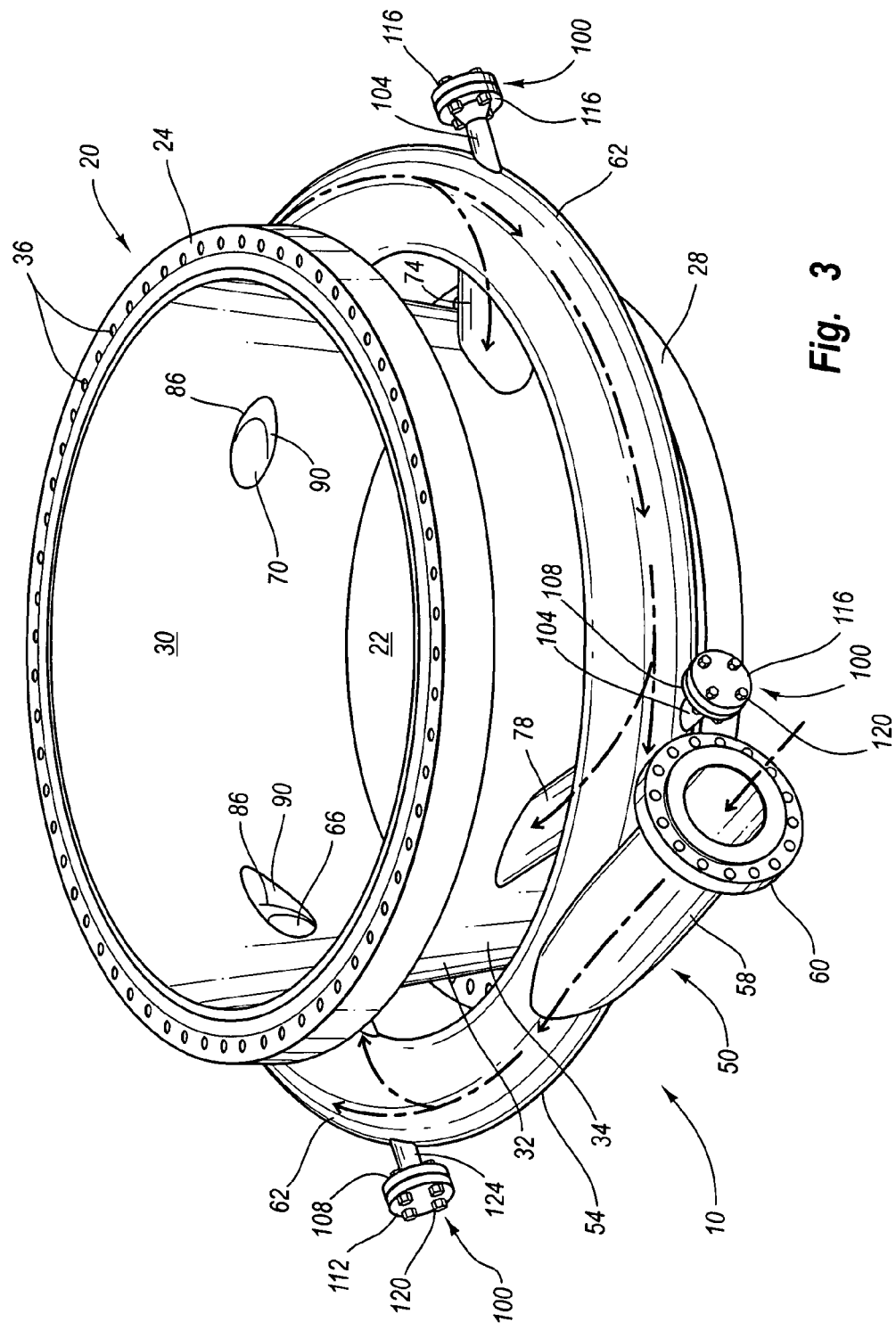
FIG. 3 illustrates a perspective view of the tangential dispenser or dispensing system, according to one exemplary embodiment of the present invention, as it is coupled to a spool that attaches between the coke drum and the de-header valve in a delayed coking system.

With reference to FIG. 3, shown is an exemplary embodiment of the present invention tangential injection system 10. This system comprises a spool 20 and a tangential dispenser 50 as it is designed to operate with spool 20 within a delayed coking system (not shown). Specifically, spool 20 comprises a cylindrical or tapered axle or support body 32 having a sidewall 34, and an upper flange 24 and lower flange 28 formed at each end of axle 32, respectively. Spool 20 is positioned intermediately between a coke drum and a de-header valve. Particularly, a coke drum (like the one shown in FIG. 1) having a matching flange section is fitted and coupled to upper flange 24 of spool 20 using a plurality of bolts (not shown) fitting through the plurality of bolt holes 36. Likewise, a de-header valve also having a matching flange section is fitted and coupled to lower flange 28 using a plurality of bolts (not shown) fitting through the plurality of bolt holes 40. Spool 20 further comprises an interior 30 and an interior sidewall surface 22.

Tangential dispenser 50 comprises a delivery main 54 that functions to deliver the residual byproduct to the plurality of bled-off lines discussed below. Tangential dispenser 50 comprises a flange 60 coupled at one end to an inlet 58, shown as a linear pipe segment, that integrally forms with a curved pipe segment 62. Flange 60 comprises a plurality of bolt holes allowing it to couple to a feed line (not shown), thereby allowing a residual byproduct, such as a petroleum byproduct used to manufacture coke, to enter into or be received by tangential dispenser 50, and particularly inlet 58 of delivery main 54, from the feed line.

Inlet 58 functions to receive the residual byproduct from the feed and extends from flange 60 as shown. Inlet 58 integrally forms with curved pipe segment 62 that extends around the perimeter of or surrounds spool 20, as shown. Of course, curved pipe segment 62 may also be designed to extend only partially around spool 20 if desired. Each of the feed line, inlet 58, and curved pipe segment 62 are in fluid connection with one another to allow a residual byproduct to travel therethrough and ultimately be deposited within spool 20 and an attached coke drum.

Delivery main 54 is comprised of scheduled pipe to withstand and deliver the high temperature, high pressure residual byproduct as intended. In one exemplary embodiment, delivery main 54 comprises schedule 160 pipe. Of course, one ordinarily skilled in the art will recognize that other sizes and materials may be used depending upon the particular end use and as system requirements dictate. Indeed, although particularly suited to be used within a delayed coking process, the present invention may be applicable in other areas of manufacture, each requiring different engineered designs. Delivery main 54 is designed to surround spool 20, either partially or annularly. Stated differently, delivery main 54 may span in a circular manner all or only a partial segment of spool 20, depending upon what the particular system requires or calls for. Moreover, delivery main 54 may comprise a uniform cross-sectional area or diameter or it may comprise varying cross-sectional areas or diameters. Designing delivery main 54 to comprise varying cross-sectional areas or diameters functions to allow designers to provide for and accommodate varying volumes and velocities of the residual byproduct therein, as well as to help equalize these as the residual byproduct flows within delivery main 54 and dispenses through the feed lines.

As the residual byproduct enters delivery main 54 at inlet 58, it is routed through curved pipe section 62 as indicated by the broken arrows. As shown in FIG. 3, tangential dispenser 50 further comprises a plurality of feed lines. In the preferred exemplary embodiment shown in FIG. 3, tangential injection system 10 comprises four feed lines, shown as feed lines 66, 70, 74, and 78, respectively. Of course, however, tangential injection system 10 may comprise any number of feed lines as desired, thus allowing system 10 to be modified to function with different systems and designs. Moreover, feed lines 66, 70, 74, and 78 are spaced an equidistance from one another to allow dispensing in respective quadrants, but these may also be spaced at any interval, equidistant or otherwise as needed. Although feed lines may be designed to be positioned anywhere along delivery main 54, including at differing distances from one another, they are preferably spaced an equidistance from one another to provide more even distribution or dispensing of the residual byproduct.

Each of feed lines 66, 70, 74, and 78 function to dispense the residual byproduct into spool 20 and the attached coke drum in a more efficient manner to provide a more even heat distribution throughout spool 20 and the coke drum. Feed lines 66, 70, 74, and 78 each comprise a pipe segment 82 that is in fluid connection with delivery main 54, and particularly curved pipe segment 62, as well as with the interior 30 of spool 20, as shown. Specifically, feed lines 66, 70, 74, and 78 each comprise an opening (shown as opening 80 in FIG. 4) that allows a calculated portion of the residual byproduct contained within delivery main 54 to pass therethrough and into pipe segment 82, as illustrated by the broken arrows in FIG. 1. Feed lines 66, 70, 74, and 78 each further comprise an end 86, cut into an end of pipe segment 82 distal from main delivery 54, that is essentially an opening that is in fluid connection with spool 20 through respective reservoir ports 90 formed within sidewall 34 of spool 20. As the residual byproduct enters from delivery main 54 through opening 80 and into pipe segment 82, it is dispensed out of each end 86 through ports 90 and into interior 30 of spool 20 and an attached coke drum.

Feed lines 66, 70, 74, and 78 are designed to comprise a smaller diameter pipe segment 82 than the pipe segments, namely inlet 58 and curved pipe segment 62, making up delivery main 54, such that the combined cross-sectional area of each of feed lines 66, 70, 74, and 78 is preferably less than or equal or substantially equal to the cross-sectional area of delivery main 54. Of course, other diameters for each are possible and contemplated herein, including different diameters for each, as well as a greater combined cross-sectional area. However, a combined cross-sectional area less than or equal to that of delivery main 54 is preferred. For instance, referring to the exemplary embodiment shown in FIG. 3, since there are four feed lines, each feed main comprises a diameter or cross-sectional area one-fourth the size of the diameter or cross-sectional area of delivery main 54. The purpose of this design is to allow only a calculated portion or quantity of residual byproduct to be dispensed at each respective feed line location. As such, the residual byproduct is forced through the entire delivery main and is dispensed from each feed line into spool 20 in an even distribution pattern, rather than being dispensed through a single pipe segment as is common in the prior art (shown in FIG. 1). This is important for the several reasons that are explained below. Specifically, with reference to FIGS. 3 and 4, as residual byproduct enters inlet 58 of delivery main 54 from the feed, it does so at a high temperature and velocity. Subsequently, the residual byproduct is routed through curved pipe segment 62, comprising each of feed lines 66, 70, 74, and 78. Taken in steps, the residual byproduct enters curved pipe section 62 and encounters opening 80 of first feed line 66. Due to the velocity of the residual byproduct within delivery main 54, a portion of this residual byproduct exits through first feed line 66 and into spool 20 through end 86. Since the diameter or cross-sectional area of first feed line 66 is approximately one-fourth the size of the diameter or cross-section of delivery main 54, only an identified and calculated portion of the total volume of residual byproduct is dispensed through first feed line 66 into spool 20. The remainder continues on through curved pipe section as shown by the arrows. Of course, the volume of the residual byproduct past first feed line is proportionately reduced as a result of that portion of the residual byproduct exiting through first feed line 66.

As the residual byproduct continues to travel through curved pipe section 62, second feed line 70 is encountered. Similarly, a portion of residual byproduct is caused to exit through opening 80, into pipe segment 82 of second feed line 70, and subsequently dispensed into spool 20 through end 86. Another portion of the residual byproduct exiting through second feed line 70 and into spool 20 functions to further reduce the overall volume of the residual byproduct remaining in the section of delivery main 54 past second feed line 70. This process continues as each of third and fourth feed lines 74, and 78 are encountered, until all of the residual byproduct has been dispensed into spool 20 (or any vessel). Moreover, as the residual byproduct continues around curved pipe section 62, various friction forces are introduced and experienced by the residual byproduct. These friction forces tend to create a reduction in the velocity of the residual material as it travels through curved pipe section 62. As such, these forces are taken into consideration when designing the particular size and location of each of feed lines 66, 70, 74, and 78, their respective angles of entry, as well as the respective cross-sectional areas of each feed line and delivery main 54.

Also, because the cumulative cross-sectional areas of each of the feed lines preferably equals or substantially equals that of delivery main 54, the system ensures that the residual byproduct will be evenly distributed and dispensed into the vessel. Indeed, a cross-sectional area taken of the volume of residual byproduct remaining after an encounter with the second to last feed line will reveal that it is equivalent or substantially equivalent to the cross-sectional area of the last feed line. This concept is equally applicable for any number of feed lines existing within and branching off of delivery main 54. Moreover, varying the cross-sectional area of delivery main 54 may also help contribute to overall even distribution of residual byproduct as the varying cross-sectional areas helps to equalize the volume and flow (e.g. velocity) of the residual byproduct within delivery main 54.

In another exemplary embodiment, the size and positioning of feed lines is varied. The relative sizes of the plurality of feed lines may vary so that the volume and/or velocity passing through the lines in somewhat equalized. Changes in velocity may be the result of many factors, and each of feed lines 66, 70, 74, and 78, as well as delivery main 54, may be designed accordingly. This may require that the first feed line be sized smaller than other successive feed lines encountered by the passing byproduct, or vice versa. In addition, the location of the feed lines relative to one another may be offset to accommodate varying conditions that occur within the delivery main. As such, the present invention contemplates designs having any sized and shaped feed lines, as well as equidistant or offset positioning. This may be done to accommodate different pressures, temperatures, velocities, etc. existing within the system, and will be part of calculated engineering efforts to determine precisely what such parameters should be.

Another unique aspect of the present invention is the design and function of pipe segments 82 and associated ends 86 of each of feed lines 66, 70, 74, and 78. As shown in FIG. 3, feed lines 66, 70, 74, and 78 are coupled between delivery main 54 and spool 20 at an angle. This angle is intended to position feed lines 66, 70, 74, and 78 in as tangential a formation as possible with respect to sidewall 34 of spool 20. Moreover, ends 86 are oblique in design due to the tangential positioning of the feed lines. Ends 86 of pipe segments 82 are oblique, or formed at angles, so as to be contiguous with sidewall 34 and reservoir ports 90 of spool 20 and to provide controlled dispensing of the residual byproduct. Specifically, due to the oblique shape of ends 86 and the corresponding oblique design of reservoir ports 90, the residual byproduct traveling through feed lines 66, 70, 74, and 78 is dispensed into or enters spool 20 and an attached coke drum at an acute angle. This may be referred to as tangential dispensing, which is different from the direct, perpendicular dispensing of prior art designs. As such, tangential dispensing is defined herein as the relative angle at which the majority of residual byproduct is dispensed or deposited into the vessel with respect to the sidewall of the vessel at the point of entrance, which relative angle is preferably substantially less than perpendicular, but that is also preferably somewhere between 1 and 90 degrees, depending upon the overall dimensions and requirements of the system. Preferably, the feed lines are designed to dispense or deposit the residual byproduct into a vessel on an angle less than 20 degrees.

From the end of each respective feed line, the residual byproduct is dispensed tangentially into spool 20 so as to effectively spray or splatter across interior sidewall surface 22 of spool 20 in a lateral manner, rather than to impact interior sidewall surface 22 at a perpendicular or substantially perpendicular manner as found in prior art designs. This tangential dispensing is a direct result of the tangential positioning of pipe segments 82 and the oblique design parameters of ends 86 and reservoir ports 90. As the residual byproduct passes through ends 86 and ports 90, it is preferably entering spool 20 at an angle less than 45 degrees relative to that particular entrance point on sidewall 34. As such, the residual byproduct is not directed toward the opposite side of the vessel, or spool 20 in the present case, but instead is caused to contact the portion of interior sidewall surface 22 directly adjacent reservoir port 90. In essence, the path the residual byproduct takes immediately upon entering spool 20 is substantially along the contour of sidewall 34 until it comes to a resting state. As can be imagined, tangential dispensing is much less violent and uniform than the dispensing in prior art designs, which provides advantages over such designs as described below. Moreover, this tangential dispensing allows the residual byproduct to be more evenly dispersed within spool 20 and the containing reservoir vessel, thus leading to more even or uniform settling of the residual byproduct within the vessel as it is allowed to cool and harden.

In addition to tangential dispensing, feed lines 66, 70, 74, and 78, and corresponding ends 86, preferably comprise vector positioning so as to allow feed lines 66, 70, 74, and 78 to be positioned at any desired angle along an x-y-z coordinate relative to the vessel or the sidewall of the vessel and/or delivery main 54. State differently, bleed lines 66, 70, 74, and 78 may be formed at any angle with respect to the corresponding vessel. In a preferred embodiment, bleed lines 66, 70, 74, and 78, and particularly pipe segments 82, in addition to their tangential positioning, are positioned on an incline from delivery main 54 or are angled upwards from delivery main 54 so that feed lines 66, 70, 74, and 78 comprises an upward orientation and so end 86 and reservoir port 90 is above opening 80. Rather, feed lines 66, 70, 74, and 78 preferably originate at delivery main 54 and extend upward to port 90. Other embodiments may position the feed lines on a downward incline or angle, depending upon design and/or system requirements. Upward positioning of feed lines 66, 70, 74, and 78 contributes to the overall dispensing and distribution of the residual byproduct within spool 20. Upward positioning allows the byproduct to be dispersed more evenly within the interior 30 of spool 20 as there is less interference between feed lines because the byproduct is dispensed at a relative position above the level of the next feed line. Upward positioning also allows spool 20 and an attached coke drum to fill in a more efficient manner because distribution is more even and each feed line is not allowed to interfere with the other. Other advantages not specifically recited herein may be apparent to one ordinarily skilled in the art. As such, those specifically recited are not meant to be limiting in any way.

The particular angle of ends 86 and reservoir ports 90 may vary depending upon system requirements and the size and dimensions of the vessels in which the material is being deposited. In a preferred embodiment, ends 86 comprise an oblique angle cut into pipe segment 82 somewhere between 1 and 60 degrees to correspond to the range of angles allowed for tangential dispensing as described above. In addition, ports 90 comprise the same range of angles. As such, the present invention contemplates the use of various angles. However, the oblique design of each of these elements should be such that tangential dispensing, as defined herein, is achieved. Most likely, if feed lines 66, 70, 74, and 78 do not comprise an oblique end, port 90 will.

Reservoir ports 90 are also preferably oblique in design so as to accommodate the incoming residual byproduct material as it passes from ends 86 into spool 20 through reservoir ports 90. Moreover, reservoir ports 90 will comprise a similar relative position and angle as that of ends 86, so as to accommodate ends 86. In one exemplary embodiment, reservoir ports 90 comprise a greater oblique area than ends 86 to provide a low or no-barrier entry for the residual byproduct as it dispenses from feed lines 66, 70, 74, and 78. This concept is illustrated in FIG. 3.

The particular design of the present invention tangential injection system 10, and particularly dispenser 50, delivery main 54 and feed lines 66, 70, 74, and 78, is unique in that it provides several advantages over prior art designs. Indeed, many of the deficiencies in the prior art designs described above are solved by the present invention. Specifically, tangential dispensing is less volatile or violent, and more importantly, there is much less thermal variance and thermal ratcheting within the vessel.

Moreover, use of a plurality of tangential dispensers or feed lines creates more even distribution of material, thus leading to more even thermal distribution throughout the vessel and the delayed coking system. This is advantageous for several reasons. First, thermal differentials are decreased because the entire vessel or spool (and connection means) maintains even heat distributions with little or no thermal variance because product is introduced into different or various parts of the vessel at substantially the same time. Thus, one side is not caused to receive byproduct first, while the other parts of the vessel remain free of byproduct until later in the process as in prior art designs. Second, much of the stress induced in prior art systems is eliminated. Uneven heat distribution induces uneven pressure points between the components of a delayed coking system, namely, the vessel and the de-heading valve, and a spool, if used. Uneven thermal distribution puts undue stress on the bolts and flange connections between the components, possibly causing them to fail sooner than necessary. By providing tangential dispensing, thermal heat distribution is more even, thus also evening out the stresses experienced within each component and the overall system. Third, thermal ratcheting within the vessel and other components of the system is significantly reduced, thus increasing the lifespan of each of these components. Thermal ratcheting is reduced because the cyclical stressing and fatiguing of each vessel is reduced during the coking cycle due to the more even distribution of heat that results from tangential dispensing.

Other advantages to the present invention tangential injection system that are not specifically recited herein may be apparent to one ordinarily skilled in the art and are intended to come within the scope of the disclosure as taught and suggested, as well as within the appended claims. As such, those advantages that have been set forth and specifically recited are not meant to be limiting in any way.

Figure 4:
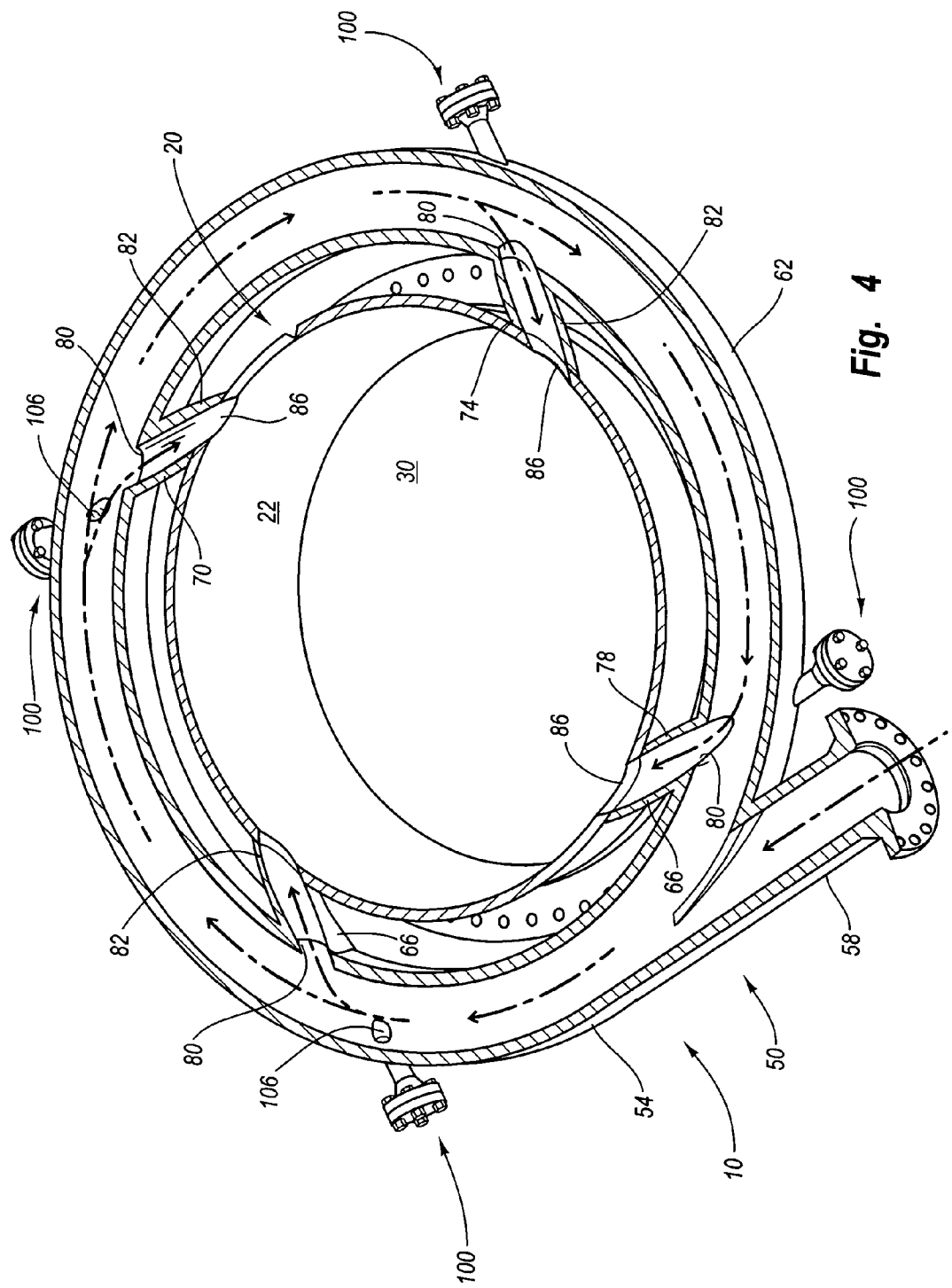
FIG. 4 illustrates a cut-away perspective view of the exemplary embodiment of the tangential dispenser described in FIG. 3.

FIG. 4 illustrates a cut away view of the tangential dispenser and the tangential vortex dispensing and delayed coking system as described above in relation to FIG. 3.

The present invention tangential dispenser 50 or dispensing system 10 further comprises hydro blasting system 100. Hydro blasting system 100 is designed to allow for the removal of whatever residual material remains in delivery main 54 and the plurality of feed lines after the coking cycle is completed. FIGS. 3 and 4 illustrate a plurality of identical hydro blasting systems, each positioned around delivery device 54. As shown, hydro blasting system 100 comprises an access line 104 that is in fluid connection with delivery main 54 via delivery port 106. Access line 104 provides access to delivery main 54 for cleaning or hydro blasting thereof. Access line 104 comprises a diameter or cross-sectional area large enough to fit a cleaning device, such as a high-pressure wand, and to allow the manipulation of the cleaning device therein.

At the end of access line 104 opposite delivery port 106, is flange 108. Flange 108 functions to accept removable end cap 116 to provide a secure attachment of the two using attachment means 120. End cap 116 functions to close off access line 104 during the coking process, but can be removed to gain access to delivery main 54 as needed. Stopper valve 112 located within access line 104 functions to seal access line from the significant pressure existing within the system during the coking process.

To purge delivery main 54 of any present residual material, end cap 116 is removed and a type of cleaning device common in the industry is inserted and operated to purge any remaining residual byproduct or material from the system. It should be noted that any number of hydro blasting systems 100 may be employed as needed or as circumstances warrant. In addition, one ordinarily skilled in the art will recognize that hydro blasting system 100 may comprise various sizes and diameters, also depending upon system dimensions and requirements.

The present invention further features a method of dispensing material into a vessel using a tangential injection system, or a method of providing even thermal distribution throughout a vessel as a result of tangential dispensing. The method involves many of the procedures or steps previously described above, and specifically comprises the steps of supplying a delivery main with residual byproduct from a feed source; routing the residual byproduct throughout the delivery main; providing a plurality of feed lines in fluid connection with the delivery main, wherein the feed lines comprise a piped section having an oblique end in fluid connection with a port in the reservoir vessel; and dispensing the residual byproduct into the reservoir vessel in a tangential manner so as to provide even thermal distribution throughout the reservoir vessel during a manufacturing process.

The above method further comprises the step of hydro blasting any remaining said residual byproduct from said tangential dispenser.

It should be noted that the present invention tangential dispenser and dispenser system can be used with or coupled directly to a coke drum, eliminating the use of a spool section. In this embodiment, the tangential dispenser and system would function as described above, only the residual byproduct would be dispensed directly into the coke drum.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes that come within the meaning and range of equivalency of the claims are to be embraced within their scope.

What is claimed is:

1. A method of tangentially dispensing a petroleum residual byproduct into a reservoir vessel as part of a delayed coking process, said method comprising the steps of:
   supplying a delivery main with residual byproduct from a feed source;
   routing said residual byproduct throughout said delivery main;
   providing a plurality of feed lines in fluid connection with said delivery main and said reservoir vessel, said feed lines substantially tangential with said reservoir vessel and
   comprising a piped section in fluid connection with a port in said reservoir vessel wherein said feed lines are spaced an equidistance from one another around said delivery main; and
   dispensing said residual byproduct into said reservoir vessel in a tangential manner to provide even thermal distribution throughout said reservoir vessel during a manufacturing process.

2. The method of claim 1, further comprising the step of hydro blasting said residual byproduct from said tangential dispenser using a cleaning device inserted into a hydro blasting system.

3. A method of tangentially dispensing a petroleum residual byproduct into a reservoir vessel as part of a delayed coking process, said method comprising the steps of:
   supplying a delivery main with residual byproduct from a feed source;
   routing said residual byproduct throughout said delivery main;
   providing a plurality of feed lines in fluid connection with said delivery main and said reservoir vessel, said feed lines substantially tangential with said reservoir vessel and
   comprising a piped section in fluid connection with a port in said reservoir vessel wherein said feed lines are spaced an equidistance from one another around said delivery main; and
   dispensing said residual byproduct into said reservoir vessel in a tangential manner to provide even thermal distribution throughout said reservoir vessel during a manufacturing process, wherein said feed lines are offset from one another and spaced at varying intervals around said delivery main.

4. A tangential dispenser in a delayed coking system comprising:
   a delivery main in fluid connection with a reservoir vessel, wherein said delivery main extends around at least a portion of the reservoir vessel said delivery main comprising:
   an inlet, fluidly connected to a feed source; containing byproduct;
   a curved pipe segment extending from and in fluid connection with said inlet to further receive and deliver said byproduct; and
   a plurality of feed lines in fluid connection with said curved pipe segment and said reservoir vessel, said feed lines positioned substantially tangential with said reservoir vessel and comprise a piped section in fluid connection with a port in said reservoir vessel, said feed lines tangentially dispensing said residual byproduct into said reservoir vessel to provide even thermal distribution throughout said reservoir vessel during a process, wherein said feed lines are spaced an equidistance from one another around said delivery main.

5. The tangential dispenser of claim 4, wherein said feed lines comprise a cumulative cross-sectional area less than or substantially equal to a cross-sectional area of said delivery main to proportionately reduce the volume of said residual byproduct remaining in said delivery main after each feed line.

6. The tangential dispenser of claim 4, wherein said feed lines comprise varying cross-sectional areas.

7. The tangential dispenser of claim 4, wherein said feed lines comprise identical cross-sectional areas.

8. The tangential dispenser of claim 4, wherein said feed lines comprises vector positioning, wherein the feed lines are positioned at any desired angle along the x-y-z coordinate with respect to either one or both of said delivery main and said reservoir vessel to obtain tangential dispensing of said byproduct.

9. The tangential dispenser of claim 4, wherein said feed lines comprise an orientation selected from inclined and declined, said inclined orientation existing as said feed line originates from said delivery main and extends upward to said port in said reservoir vessel, and said declined orientation existing as said feed line originates from said delivery main and extends downward to said port in said reservoir vessel.

10. The tangential dispenser of claim 4, further comprising a hydro blasting system to purge material from said delivery main and said feed lines, said hydro blasting system comprising:
an access line in fluid connection with said delivery main;
a delivery port providing access to said access line from without said system by one or more cleaning and purging devices; and
sealing means for sealing said access line during a manufacturing process.

11. The tangential dispenser of claim 4, wherein said reservoir vessel is a coke drum as contained within a delayed coking system.

12. The tangential dispenser of claim 4, wherein said reservoir vessel is a spool attaching two flanged components together.

13. The tangential dispenser of claim 4, wherein said delivery main annularly surrounds said reservoir vessel.

14. The tangential dispenser of claim 4, wherein said delivery main comprises varying cross-sectional areas along its span around said reservoir vessel to provide for and accommodate varying volumes of said residual byproduct.

15. The tangential dispenser of claim 4, wherein said residual byproduct is tangentially dispensed within said reservoir vessel at an angle between 0 and 90 degrees.

16. The tangential dispenser of claim 4, wherein a majority of said residual byproduct is dispensed within said reservoir vessel at an angle between about 20 and 30 degrees.

17. The tangential dispenser of claim 4, wherein said feed lines comprise an oblique end.

18. The tangential dispenser of claim 4, wherein said port on said reservoir vessel comprises an oblique shaped segment leading into said reservoir vessel.

19. The tangential dispenser of claim 4, wherein said residual byproduct sprays across a sidewall interior in a lateral, tangential manner.

20. The tangential dispenser of claim 4, wherein said port comprises an oblique configuration larger in size than an adjacent opening in said feed line to provide a low-barrier entry of said residual byproduct into said reservoir vessel.

21. The tangential dispenser of claim 4, wherein said delivery main surrounds said reservoir vessel.

22. A tangential injection system within a delayed coking system, said tangential injection system comprising:
a spool fittable to a coke drum and a de-header valve;
a tangential dispenser coupled to said spool, said tangential dispenser comprising:
a delivery main in fluid connection with a reservoir vessel, said delivery main comprising:
an inlet capable of receiving byproduct from a feed source;
a curved pipe segment extending from and in fluid connection with said inlet to further receive and deliver said byproduct;
a plurality of feed lines in fluid connection with said delivery main and said spool, said feed lines are tangential to said spool and comprise a piped section in fluid connection with a port in said spool, said feed lines dispensing said residual byproduct into said spool in a tangential manner to provide even thermal distribution throughout said spool during a manufacturing process wherein said feed lines are spaced an equidistance from one another around said delivery main; and
a hydro blasting system operable with said tangential dispenser, said hydro blasting system providing access to said delivery main by a cleaning device to purge said tangential dispenser of residual byproduct upon completion of a manufacturing cycle.

23. A delayed coking system comprising:
a feed source capable of delivering a petroleum byproduct to said delayed coking system;
a reservoir vessel;
a de-header valve;
a tangential injection system in operation with said reservoir vessel, said tangential injection system comprising:
a spool fittable in an intermediate position between said reservoir vessel and said de-header valve;
a tangential dispenser coupled to said spool, said tangential dispenser comprising:
a delivery main in fluid connection with a reservoir vessel, wherein said delivery main comprises an inlet capable of receiving said byproduct from said feed source and a curved pipe segment extending from said inlet to further receive and deliver said byproduct;
a plurality of feed lines in fluid connection with said delivery main and said reservoir vessel, said feed lines oriented substantially tangential with said reservoir vessel and comprising a piped section in fluid connection with a port in said reservoir vessel, said feed lines dispensing said residual byproduct into said reservoir vessel in a tangential manner to provide even thermal distribution throughout said reservoir vessel during a manufacturing process wherein said feed lines are offset from one another and spaced at varying intervals around said delivery main; and
a hydro blasting system operable with said tangential dispenser, said hydro blasting system providing access to said delivery main by a cleaning device to purge said tangential dispenser of residual byproduct upon completion of a manufacturing cycle.

24. A tangential dispenser for use with a delayed coking system comprising:
a delivery main in fluid connection with a reservoir vessel, wherein said delivery main extends around at least a portion of the reservoir vessel said delivery main comprising:
an inlet, fluidly connected to a feed source; containing byproduct;
a curved pipe segment extending from and in fluid connection with said inlet to further receive and deliver said byproduct; and
a plurality of feed lines in fluid connection with said curved pipe segment and said reservoir vessel, said feed lines positioned substantially tangential with said reservoir vessel and comprise a piped section in fluid connection with a port in said reservoir vessel, said feed lines tangentially dispensing said residual byproduct into said reservoir vessel to provide even thermal distribution throughout said reservoir vessel during a process, wherein said feed lines are spaced an equidistance from one another around said delivery main, wherein said feed lines are offset from one another and spaced at varying intervals around said delivery main.

25. The tangential dispenser of claim 24, wherein said feed lines comprise a cumulative cross-sectional area less than or substantially equal to a cross-sectional area of said delivery main to proportionately reduce the volume of said residual byproduct remaining in said delivery main after each feed line.

26. The tangential dispenser of claim 24, wherein said feed lines comprise varying cross-sectional areas.

27. The tangential dispenser of claim 24, wherein said feed lines comprise identical cross-sectional areas.

28. The tangential dispenser of claim 24, wherein said feed lines comprises vector positioning, wherein the feed lines are positioned at any desired angle along the x-y-z coordinate with respect to either one or both of said delivery main and said reservoir vessel to obtain tangential dispensing of said byproduct.

29. The tangential dispenser of claim 24, wherein said feed lines comprise an orientation selected from inclined and declined, said inclined orientation existing as said feed line originates from said delivery main and extends upward to said port in said reservoir vessel, and said declined orientation existing as said feed line originates from said delivery main and extends downward to said port in said reservoir vessel.

30. The tangential dispenser of claim 24, further comprising a hydro blasting system to purge material from said delivery main and said feed lines, said hydro blasting system comprising:
    an access line in fluid connection with said delivery main;
    a delivery port providing access to said access line from without said system by one or more cleaning and purging devices; and
    sealing means for sealing said access line during a manufacturing process.

31. The tangential dispenser of claim 24, wherein said reservoir vessel is a coke drum as contained within a delayed coking system.

32. The tangential dispenser of claim 24, wherein said reservoir vessel is a spool attaching two flanged components together.

33. The tangential dispenser of claim 24, wherein said delivery main annularly surrounds said reservoir vessel.

34. The tangential dispenser of claim 24, wherein said delivery main comprises varying cross-sectional areas along its span around said reservoir vessel to provide for and accommodate varying volumes of said residual byproduct.

35. The tangential dispenser of claim 24, wherein said residual byproduct is tangentially dispensed within said reservoir vessel at an angle between 0 and 90 degrees.

36. The tangential dispenser of claim 24, wherein a majority of said residual byproduct is dispensed within said reservoir vessel at an angle between about 20 and 30 degrees.

37. The tangential dispenser of claim 24, wherein said feed lines comprise an oblique end.

38. The tangential dispenser of claim 24, wherein said port on said reservoir vessel comprises an oblique shaped segment leading into said reservoir vessel.

39. The tangential dispenser of claim 24, wherein said residual byproduct sprays across a sidewall interior in a lateral, tangential manner.

40. The tangential dispenser of claim 24, wherein said port comprises an oblique configuration larger in size than an adjacent opening in said feed line to provide a low-barrier entry of said residual byproduct into said reservoir vessel.

41. The tangential dispenser of claim 24, wherein said delivery main surrounds said reservoir vessel.

* * * * *